(12) United States Patent
Ohno et al.

(10) Patent No.: US 12,286,034 B2
(45) Date of Patent: Apr. 29, 2025

(54) OCCUPANT PROTECTION AUXILIARY DEVICE

(71) Applicant: TOYOTA JIDOSHA KABUSHIKI KAISHA, Aichi-ken (JP)

(72) Inventors: Mitsuyoshi Ohno, Miyoshi (JP); Atsushi Ishii, Chita (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 210 days.

(21) Appl. No.: 18/179,386

(22) Filed: Mar. 7, 2023

(65) Prior Publication Data

US 2023/0365030 A1 Nov. 16, 2023

(30) Foreign Application Priority Data

May 16, 2022 (JP) .................. 2022-080053

(51) Int. Cl.
*B60N 2/01* (2006.01)
*B60K 31/00* (2006.01)
*B60N 2/02* (2006.01)
*B60N 2/42* (2006.01)
(Continued)

(52) U.S. Cl.
CPC ............ *B60N 2/0276* (2013.01); *B60K 31/00* (2013.01); *B60N 2/01* (2013.01); *B60N 2/4279* (2013.01); *B60Q 9/00* (2013.01); *B60K 2031/0091* (2013.01); *B60N 2/0268* (2023.08); *B60N 2/4221* (2013.01)

(58) Field of Classification Search
CPC ...... B60N 2/0276; B60N 2/01; B60N 2/4279; B60N 2/0268; B60N 2/4221; B60N 2210/18; B60N 2210/24; B60N 2/0028; B60N 2/22; B60N 2/4228; B60N 2/42745; B60N 2/0244; B60K 31/00; B60K 2031/0091; B60Q 9/00; B60Q 2800/10; B60Q 9/008; B60W 30/143; B60W 2520/10; B60W 2540/223; B60R 11/0217; B60R 11/04; B60R 2011/0003; B60R 2011/0028

See application file for complete search history.

(56) References Cited

U.S. PATENT DOCUMENTS 5,848,802 A * 12/1998 Breed ............... B60R 21/01516
180/272
6,254,127 B1 * 7/2001 Breed ................. B60N 2/0276
280/731
(Continued)

FOREIGN PATENT DOCUMENTS

JP 2018118671 A 8/2018
JP 2018135038 A 8/2018
(Continued)

*Primary Examiner* — Kurt Philip Liethen
(74) *Attorney, Agent, or Firm* — HAUPTMAN HAM, LLP

(57) ABSTRACT

An occupant protection auxiliary device includes: a seat mounted on a vehicle and on which an occupant is able to sit while facing a rear of the vehicle; a head detection sensor able to detect a relative position of a head of the occupant with respect to a headrest of the seat; and a control unit that determines whether to execute at least one of alerting the occupant, setting a speed limit, and changing a reclining angle based on a detection result of the head detection sensor.

11 Claims, 9 Drawing Sheets

(51) Int. Cl.
*B60N 2/427* (2006.01)
*B60Q 9/00* (2006.01)

(56) References Cited

U.S. PATENT DOCUMENTS

| | | | | |
|---|---|---|---|---|
| 6,270,116 | B1 * | 8/2001 | Breed | B60R 21/01534 |
| | | | | 180/287 |
| 6,302,545 | B1 * | 10/2001 | Schofield | B60S 1/0822 |
| | | | | 348/E7.086 |
| 6,422,595 | B1 * | 7/2002 | Breed | B60R 21/01534 |
| | | | | 701/45 |
| 6,910,711 | B1 * | 6/2005 | Breed | B60N 2/02246 |
| | | | | 180/272 |
| 10,372,130 | B1 * | 8/2019 | Kaushansky | B60W 60/001 |
| 11,541,794 | B1 * | 1/2023 | Muralidharan | B60R 21/013 |
| 11,619,949 | B2 * | 4/2023 | Wendel | B60R 21/01556 |
| | | | | 701/28 |
| 11,794,742 | B1 * | 10/2023 | Belo | B60W 30/025 |
| 2018/0236907 | A1 | 8/2018 | Ohno | |
| 2020/0269726 | A1 * | 8/2020 | Ohno | B60N 2/06 |
| 2021/0034067 | A1 * | 2/2021 | Wendel | B60R 22/48 |
| 2021/0402891 | A1 * | 12/2021 | Oommen | B60N 2/0034 |

FOREIGN PATENT DOCUMENTS

| | | |
|---|---|---|
| JP | 2021509876 A | 4/2021 |
| WO | 2019164825 A1 | 8/2019 |

* cited by examiner ized that the seat to a predetermined rear collision protection state, i.e., the front surface of a headrest protrudes to the vehicle front side.

OCCUPANT PROTECTION AUXILIARY DEVICE

CROSS-REFERENCE TO RELATED APPLICATION

This application claims priority to Japanese Patent Application No. 2022-080053 filed on May 16, 2022, incorporated herein by reference in its entirety.

BACKGROUND

1. Technical Field

The present disclosure relates to an occupant protection auxiliary device.

2. Description of Related Art

Japanese Unexamined Patent Application Publication No. 2018-135038 (JP 2018-135038 A) discloses a device that shifts a seat to a predetermined rear collision protection state when a rear collision (rear side collision) is predicted while the occupant is seated on the seat while facing forward. Specifically, in the device described in JP 2018-135038 A, when a rear collision is predicted, the front surface of a headrest protrudes towards the vehicle front side.

SUMMARY

The device described in JP 2018-135038 A can protect the occupant from a rear collision while the occupant is seated facing forward. On the other hand, in the case of a frontal collision (front side collision) with the occupant seated facing rearward, a larger collision load is likely to be input than in a rear collision because the vehicle is traveling in the direction of travel. Since the head of the occupant may climb over the headrest, countermeasures are required.

An object of the present disclosure is to provide an occupant protection auxiliary device capable of improving collision protection performance for an occupant seated facing rearward.

An occupant protection auxiliary device according to claim 1 includes: a seat mounted on a vehicle and on which an occupant is able to sit while facing a rear side of the vehicle; a head detection sensor able to detect a relative position of a head of the occupant with respect to a headrest of the seat; and a control unit that determines whether to execute at least one of alerting the occupant, setting a speed limit, and changing a reclining angle based on a detection result of the head detection sensor.

In the occupant protection auxiliary device according to claim 1, the occupant can sit on the seat mounted on the vehicle while facing the vehicle rear side. The head detection sensor can detect the relative position of the head of the occupant with respect to the headrest of the seat. The control unit determines whether to execute at least one of alerting the occupant, setting the speed limit, and changing the reclining angle based on the detection result of the head detection sensor. Accordingly, for example, when the relative position of the head of the occupant with respect to the headrest is relatively large, that is, when the difference between the headrest and the head of the occupant is relatively small, the control unit determines that the alert is executed to the occupant, and thus the occupant is alerted.

Further, for example, when the relative position of the head of the occupant with respect to the headrest is relatively large, the control unit determines to set the speed limit, and thus the speed limit is set to the vehicle, thereby suppressing a collision at a high vehicle speed. Furthermore, for example, when the relative position of the head of the occupant with respect to the headrest is relatively large, the control unit determines that the reclining angle is changed, and thus the seat back is caused to pivot in the upright direction, making it difficult for the head of the occupant to climb over the headrest.

In the occupant protection auxiliary device according to claim 2, in claim 1, the control unit determines whether to execute at least one of alerting the occupant, setting the speed limit, and changing the reclining angle based on the reclining angle of the seat and the detection result of the head detection sensor.

In the occupant protection auxiliary device according to claim 2, when the reclining angle is large with the occupant being in a comfortable posture and when the relative position of the head of the occupant with respect to the headrest is relatively large, countermeasures against a frontal collision are executed. This can suppress unnecessary execution of countermeasures against a frontal collision compared to a configuration in which it is determined whether countermeasures against a frontal collision need to be executed based only on the relative position of the head of the occupant with respect to the headrest, and thus the comfort of the occupant can be ensured.

In the occupant protection auxiliary device according to claim 3, in claim 1, the control unit determines whether to execute at least one of alerting the occupant, setting the speed limit, and changing the reclining angle based on a speed of the vehicle and the detection result of the head detection sensor.

In the occupant protection auxiliary device according to claim 3, when the vehicle speed is high and when the relative position of the head of the occupant with respect to the headrest is relatively large, countermeasures against a frontal collision are executed. This can suppress unnecessary execution of countermeasures against a frontal collision compared to a configuration in which it is determined whether countermeasures against a frontal collision need to be executed based only on the relative position of the head of the occupant with respect to the headrest, and thus the comfort of the occupant can be ensured.

In the occupant protection auxiliary device according to claim 4, in claim 3, the control unit changes a threshold value at a time of determination in accordance with presence or absence of an oncoming lane.

In the occupant protection auxiliary device according to claim 4, the threshold value used for determining whether countermeasures against a frontal collision are necessary is changed in accordance with the presence or absence of an oncoming lane. Here, when there is an oncoming lane, the possibility of a frontal collision is higher than when there is no oncoming lane. When colliding with an oncoming vehicle, the input collision load is likely to be larger than when colliding with a preceding vehicle in the same lane. Therefore, by lowering the threshold value at the time of determination when there is an oncoming lane, it is easier to take countermeasures against a frontal collision, making it possible to improve the protection performance for the occupant.

In the occupant protection auxiliary device according to claim 5, in any one of claims 1 to 4, when the control unit determines that it is necessary to alert the occupant based on the detection result of the head detection sensor, the control unit alerts the occupant by a voice from a speaker mounted on the vehicle.

In the occupant protection auxiliary device according to claim 5, by outputting a voice from the speaker, for example, an alert indicating that the countermeasures against the frontal collision are insufficient is performed to the occupant. Thus, the occupant can be prompted to change the seat position or the like.

In the occupant protection auxiliary device according to claim 6, in any one of claims 1 to 4, when the control unit determines that it is necessary to set the speed limit based on the detection result of the head detection sensor, the control unit sets an upper limit value of a vehicle speed.

In the occupant protection auxiliary device according to claim 6, by setting the upper limit value of the vehicle speed, the vehicle is suppressed from traveling in a speed range in which the collision load input to the vehicle in the event of a frontal collision increases.

In the occupant protection auxiliary device according to claim 7, in any one of claims 1 to 4, when the control unit determines that it is necessary to change the reclining angle based on the detection result of the head detection sensor, the control unit controls the seat such that a seat back pivots in an upright direction.

In the occupant protection auxiliary device according to claim 7, the seat back is caused to pivot in the upright direction, which can suppress the occupant from riding up along the seat back when the occupant moves inertially toward the vehicle front side in the event of a frontal collision.

In the occupant protection auxiliary device according to claim 8, in any one of claims 1 to 4, the head detection sensor includes a camera that captures an image of the occupant from the rear side of the vehicle.

In the occupant protection auxiliary device according to claim 8, the relative position of the head of the occupant with respect to the headrest can be detected with high accuracy by imaging the occupant from the rear side of the vehicle with the camera, compared to the configuration in which the occupant is imaged from other directions with the camera.

In the occupant protection auxiliary device according to claim 9, in claim 8, a pattern is woven into the headrest with a material having a high infrared reflectance, and the camera is an infrared camera.

In the occupant protection auxiliary device according to claim 9, the relative position of the head of the occupant with respect to the headrest can be detected with high accuracy even at night by detecting the pattern woven into the headrest by the infrared camera.

As described above, the occupant protection auxiliary device according to the present disclosure can improve collision protection performance for an occupant seated facing rearward.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An occupant protection auxiliary device 10 according to an embodiment will be described with reference to the drawings.

Figure 1:
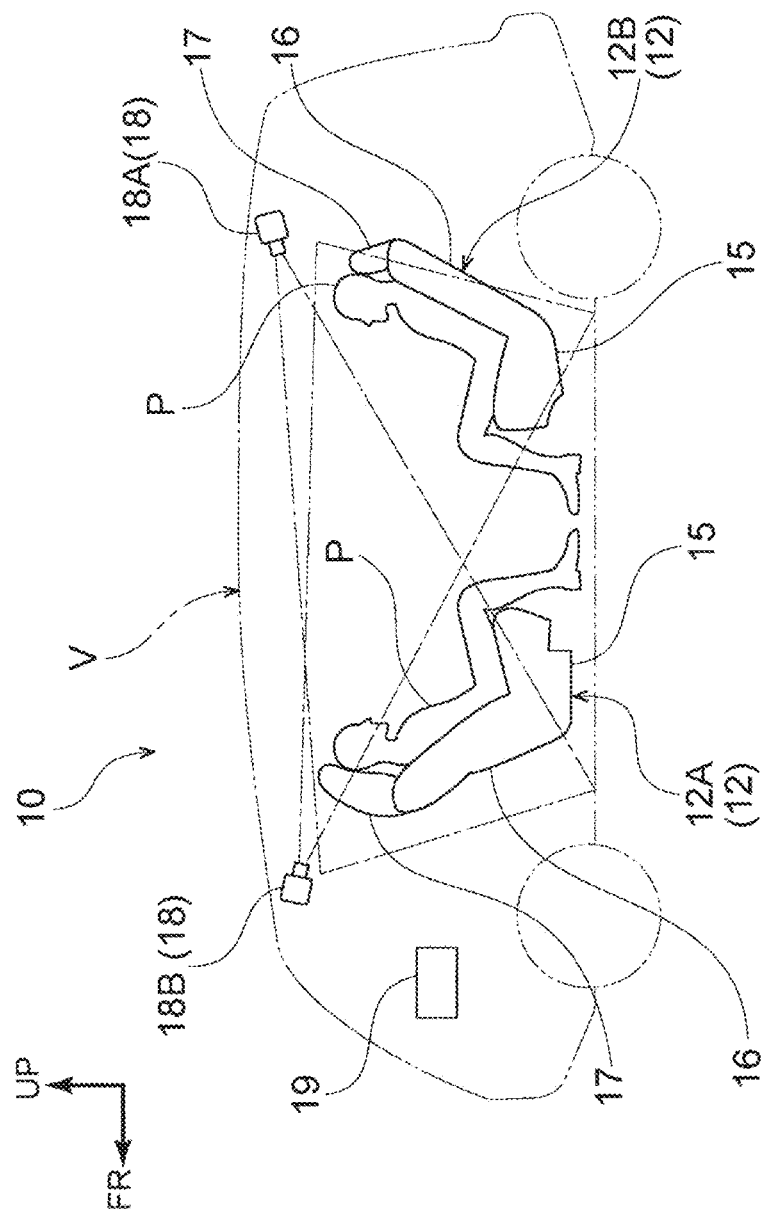
FIG. 1 is a schematic side view of a vehicle provided with an occupant protection auxiliary device according to an embodiment, viewed from a vehicle width direction.

As shown in FIG. 1, the occupant protection auxiliary device 10 of the present embodiment is mounted on a vehicle V and includes seats 12, head detection sensors 18, and a control unit 19. Note that the vehicle V of the present embodiment is capable of autonomous driving as an example. In other words, the acceleration/deceleration and steering of the vehicle V are controlled without an occupant P driving the vehicle.

Here, in the present embodiment, the seats 12 include a front seat 12A located on the vehicle front side and a rear seat 12B located on the vehicle rear side. The front seat 12A is configured so that the direction of the seat can be changed, and by turning the direction of the front seat 12A toward the vehicle rear side, the occupant P can be seated while facing the vehicle rear side so that the occupant P on the front seat 12A and the occupant P on the rear seat 12B face each other.

The front seat 12A and the rear seat 12B each have a seat cushion 15 capable of supporting the buttocks and thighs of the occupant P from below, a seat back 16 capable of supporting the back of the occupant P, and a headrest 17 capable of supporting the head of the occupant P.

Here, the seat back 16 is configured to be pivotable in the vehicle front-rear direction with respect to the seat cushion 15, and is configured to be able to be tilted further than the reclining angle during driving. In the following description, the reclining angle is the tilting angle when the state where the seat back 16 is vertical is considered as 0 degrees.

Figure 4:
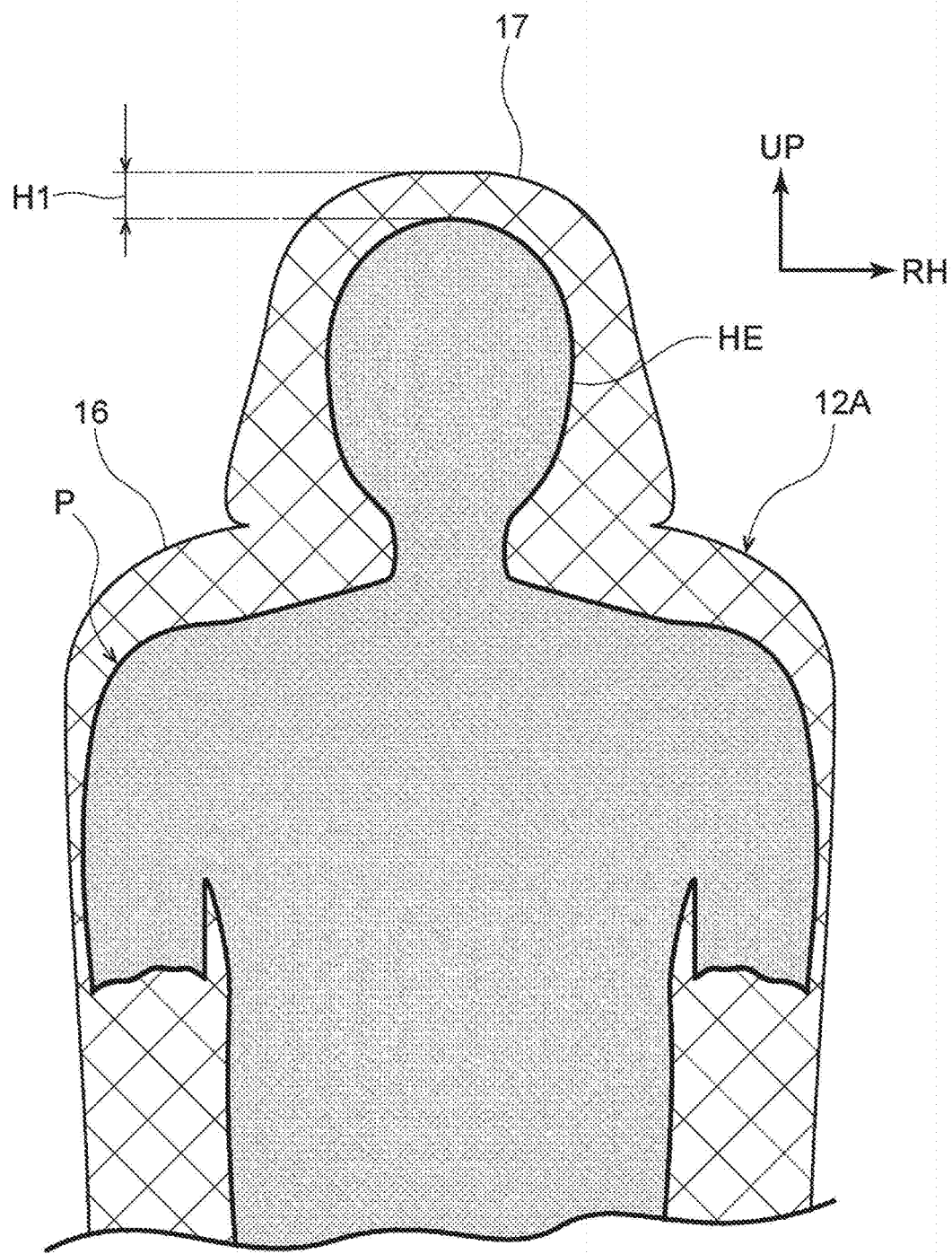
FIG. 4 is a diagram showing image data obtained by imaging a seat in the embodiment with an infrared camera, showing an example of detecting the relative position of the head.

In the present embodiment, a pattern is woven into the seat back 16 and the headrest 17 with a material having a high infrared reflectance. As shown in FIG. 4, the seat back 16 and the headrest 17 of the present embodiment are woven with a material having a high infrared reflectance, so that the seat back 16 and the headrest 17 are configured to reflect infrared light when an image is captured by an infrared camera.

The head detection sensors 18 are provided on the ceiling of the vehicle cabin of the vehicle V. The head detection sensors 18 include a front seat infrared camera 18A and a rear seat infrared camera 18B.

The front seat infrared camera 18A is provided on the ceiling at the rear of the vehicle and is directed toward the front seat 12A. An image of the occupant P seated on the front seat 12A is captured by the front seat infrared camera 18A.

The rear seat infrared camera 18B is provided on the ceiling at the front of the vehicle and directed toward the rear seat 12B. An image of the occupant P seated on the rear seat 12B is captured by the rear seat infrared camera 18B.

Here, in the present embodiment, the vehicle V is equipped with the control unit 19.

Hardware Configuration of Occupant Protection Auxiliary Device 10

Figure 2:
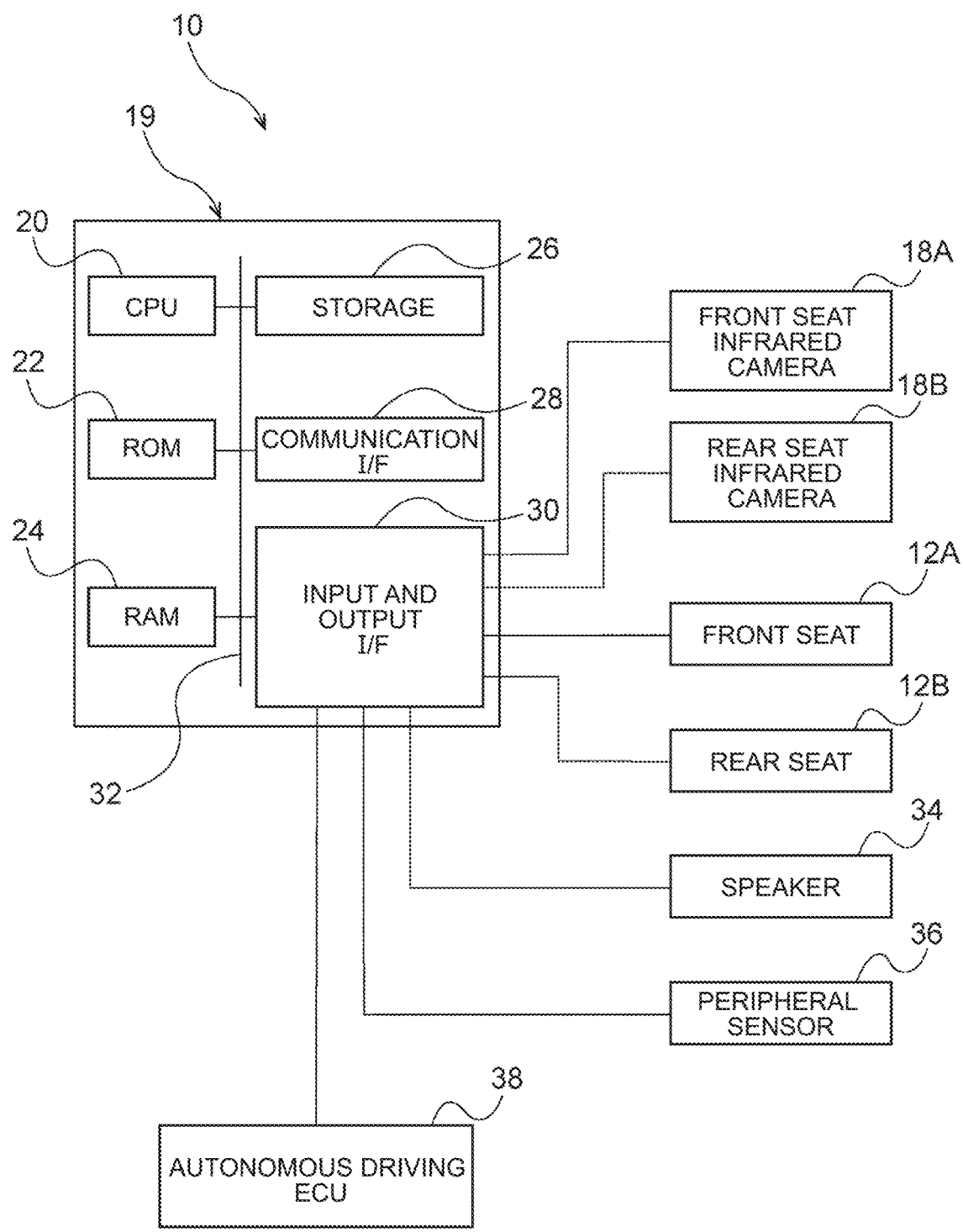
FIG. 2 is a block diagram showing a hardware configuration of a control unit according to the embodiment.

FIG. 2 is a block diagram showing a hardware configuration of the control unit 19. As shown in FIG. 2, the control unit 19 includes a central processing unit (CPU: processor) 20, a read-only memory (ROM) 22, a random access memory (RAM) 24, a storage 26, a communication interface (I/F) 28, and an input and output I/F 30. The components above are connected via a bus 32 so as to be mutually communicable.

The CPU 20 is a central arithmetic processing unit that executes various programs and controls each of the units. That is, the CPU 20 reads the program from the ROM 22 or the storage 26, and executes the program using the RAM 24 as a work area. The CPU 20 controls each of the above components and performs various arithmetic processes in accordance with the programs recorded in the ROM 22 or the storage 26.

The ROM 22 stores various programs and various data. The RAM 24 temporarily stores a program or data as a work area. The storage 26 is composed of a hard disk drive (HDD) or a solid state drive (SSD) and stores various programs including an operating system and various types of data. In the present embodiment, the ROM 22 or the storage 26 stores a program for performing various processes and various data, etc.

The communication I/F 28 is an interface for the control unit 19 to communicate with devices such as a server (not shown), and standards such as a controller area network (CAN), Ethernet (registered trademark), long term evolution (LTE), fiber distributed data interface (FDDI), and Wi-Fi (registered trademark) are used.

The front seat infrared camera 18A, the rear seat infrared camera 18B, the front seat 12A, the rear seat 12B, a speaker 34, a peripheral sensor 36, and an autonomous driving electronic control unit (ECU) 38 are electrically connected to the input and output I/F 30.

The control unit 19 acquires an image captured by the front seat infrared camera 18A via the input and output I/F 30. The control unit 19 also acquires an image captured by the rear seat infrared camera 18B via the input and output I/F 30.

The control unit 19 is configured to be able to acquire the reclining angle of the front seat 12A via the input and output I/F 30. An electric recliner (not shown) is mounted on the front seat 12A, and the recliner is operated by the control unit 19 so that the reclining angle of the front seat 12A can be changed.

The control unit 19 is configured to be able to acquire the reclining angle of the rear seat 12B via the input and output I/F 30. An electric recliner (not shown) is mounted on the rear seat 12B, and the recliner is operated by the control unit 19 so that the reclining angle of the rear seat 12B can be changed.

The speaker 34 is provided in the vehicle cabin and configured to be able to output sound to the occupant P, and outputs a predetermined sound based on a signal from the control unit 19.

The peripheral sensor 36 is composed of a group of sensors provided around the vehicle V, and detects the state around the vehicle V.

The autonomous driving ECU 38 is connected to a throttle actuator that changes the throttle opening degree of the vehicle V, a brake actuator that changes the braking force of the vehicle V, and a steering actuator that changes the steering amount of the vehicle V, and performs autonomous driving processes to cause the vehicle V to travel autonomously.

Functional Configuration of Occupant Protection Auxiliary Device 10

The occupant protection auxiliary device 10 realizes various functions using the hardware resources mentioned above. The functional configurations realized by the occupant protection auxiliary device 10 will be described with reference to FIG. 3.

Figure 3:
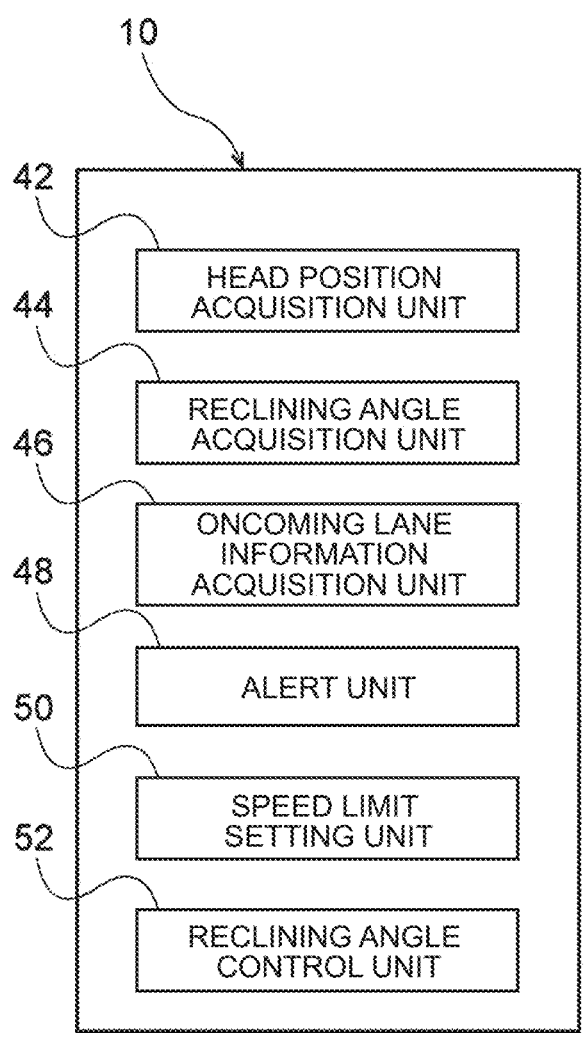
FIG. 3 is a block diagram showing a functional configuration of the occupant protection auxiliary device according to the embodiment.

As shown in FIG. 3, the occupant protection auxiliary device 10 includes a head position acquisition unit 42, a reclining angle acquisition unit 44, an oncoming lane information acquisition unit 46, an alert unit 48, a speed limit setting unit 50, and a reclining angle control unit 52 as functional configurations. Each functional configuration is realized by the CPU 20 as the CPU 20 reads and executes the program stored in the ROM 22 or the storage 26.

The head position acquisition unit 42 acquires the relative position of the head of the occupant P with respect to the headrest 17 of the seat 12. Specifically, the head position acquisition unit 42 acquires the relative position of the head of the occupant P on the front seat 12A based on image information captured by the front seat infrared camera 18A. The head position acquisition unit 42 also acquires the relative position of the head of the occupant P on the rear seat 12B based on image information captured by the rear seat infrared camera 18B.

Here, an example of a method of acquiring the head position of the occupant P seated on the rear seat 12B will be described with reference to FIG. 4. As shown in FIG. 4, in the image captured by the front seat infrared camera 18A, the occupant P having a low infrared reflectance is displayed dark, and the seat back 16 and the headrest 17 are displayed bright. By performing image processing, it is possible to detect the upper end of the headrest 17 and the upper end of the head HE of the occupant P, and the head position acquisition unit 42 acquires the height difference H1 between the upper end of the headrest 17 and the head HE as the relative position of the head HE. Therefore, the higher the relative position of the head HE of the occupant P with respect to the headrest 17 is, the smaller the relative position of the head HE acquired by the head position acquisition unit 42 is.

Note that the acquisition method of the relative position of the head HE is not limited to the example shown in FIG. 4, and may be acquired by other methods. For example, the relative position of the head HE may be acquired by the methods shown in FIGS. 5 and 6.

Figure 5:
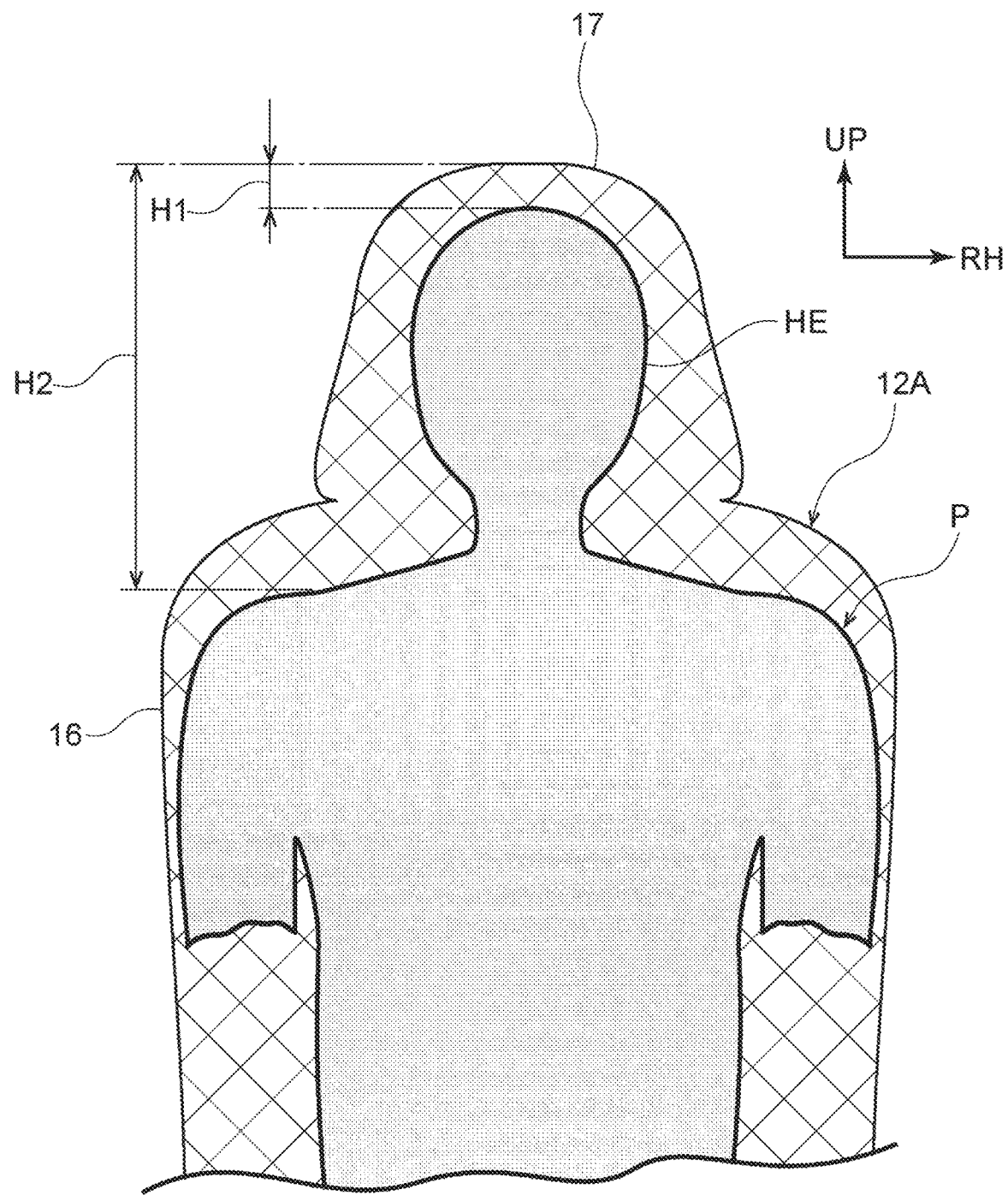
FIG. 5 shows another example of detecting the relative position of the head.

In the method shown in FIG. 5, the head position acquisition unit 42 calculates the relative position of the head HE based on the height difference H1 between the upper end of the headrest 17 and the head HE and the difference H2 between the upper end of the headrest 17 and the shoulder height. With the method of FIG. 5, even if the position of the head HE cannot be accurately detected, the height of the head HE can be estimated in consideration of the difference H2.

Figure 6:
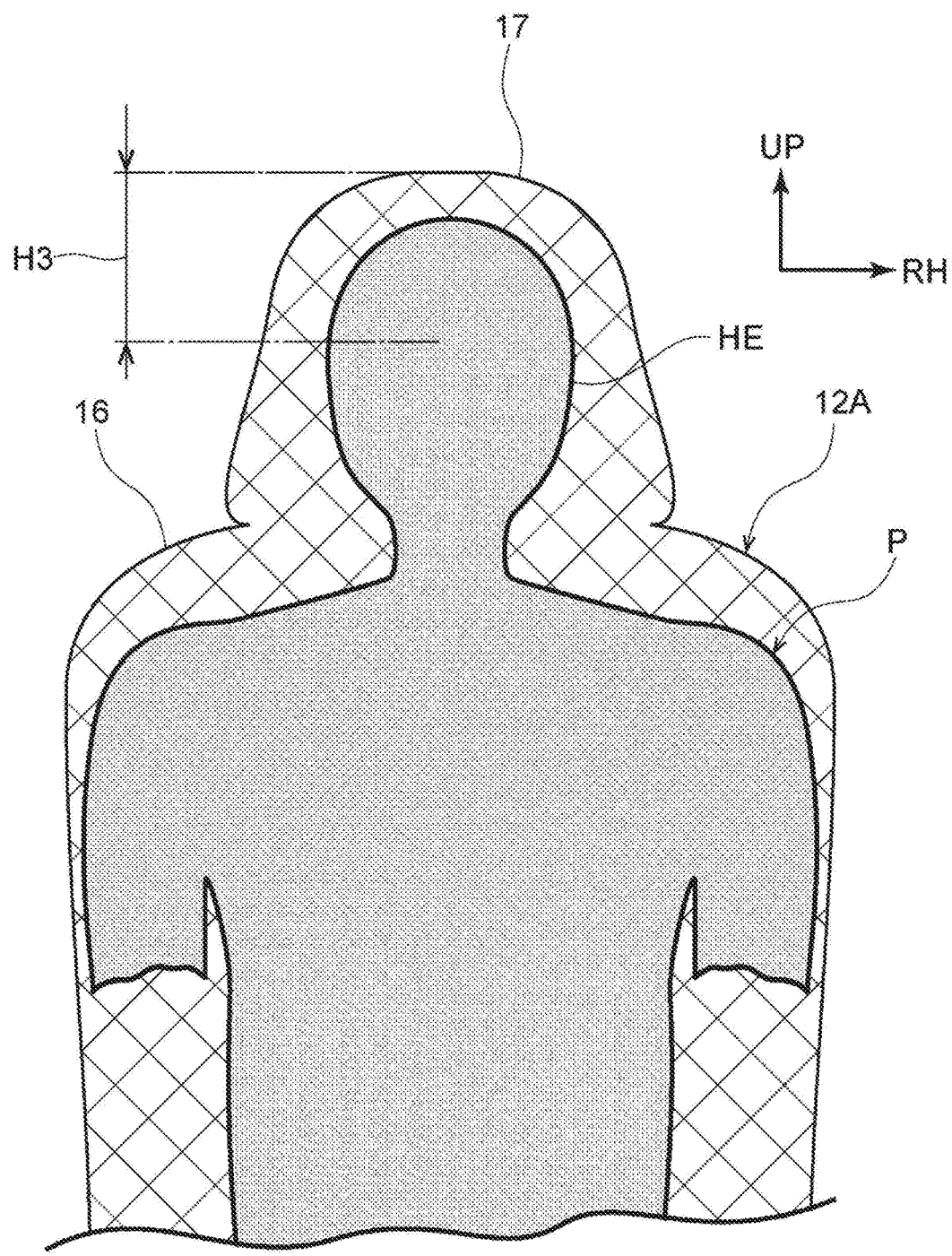
FIG. 6 shows still another example of detecting the relative position of the head.

In the method shown in FIG. 6, the head position acquisition unit 42 acquires the difference H3 between the upper end of the headrest 17 and the eye level of the occupant P as the relative position of the head HE. For the eye level, for example, the positions of both eyes may be detected and the height of the middle point may be used as the eye level. Although the front seat infrared camera 18A can detect the eyes of the occupant P, the eyes are not shown in FIG. 6 for convenience of explanation.

The reclining angle acquisition unit 44 in FIG. 3 acquires the reclining angle of the seat 12. Specifically, the reclining angle acquisition unit 44 acquires the reclining angle of the front seat 12A from a signal from the recliner of the front seat 12A. The reclining angle acquisition unit 44 also acquires the reclining angle of the rear seat 12B from a signal from the recliner of the rear seat 12B.

The oncoming lane information acquisition unit 46 acquires information on the oncoming lane adjacent to the traveling lane of the vehicle V. Specifically, the oncoming lane information acquisition unit 46 acquires the information on the oncoming lane adjacent to the traveling lane based on a signal from the peripheral sensor 36, information stored in the navigation system, and the like. Note that the oncoming lane here includes only those adjacent to the traveling lane. Therefore, when there is an oncoming lane across the median strip, the oncoming lane information acquisition unit 46 determines that there is no oncoming lane adjacent to the traveling lane.

When the alert unit 48 determines that it is necessary to alert the occupant P based on the relative position H1 of the head HE acquired by the head position acquisition unit 42, the alert unit 48 alerts the occupant P by outputting a voice from the speaker 34 mounted on the vehicle V. Further, the alert unit 48 may alert the occupant P through display on a monitor (not shown) mounted on the vehicle V or the like.

Here, as an example, the alert unit 48 of the present embodiment performs the alert based on the reclining angle of the seat 12 and the relative position H1 of the head HE acquired by the head position acquisition unit 42. Specifically, the alert unit 48 alerts the occupant P when the relative position H1 of the head HE is smaller than a threshold value L1 shown in FIG. 7.

That is, in the case where the reclining angle is equal to or less than the predetermined angle θ, when the relative position of the head HE is smaller than HA, the occupant P is alerted. In the case where the reclining angle exceeds the predetermined angle θ, when the relative position of the head HE is smaller than the threshold value L1 that varies in accordance with the reclining angle, the occupant P is alerted. The reclining angle θ is set to, for example, 30°, and if the reclining angle exceeds 30°, the head HE is likely to climb over the headrest 17 when the occupant P moves inertially due to a frontal collision. Therefore, the threshold value of the alert is increased so that the alert is performed even when the relative position of the head HE is relatively large.

The speed limit setting unit 50 sets the upper limit value of the vehicle speed when determining that the speed limit of the vehicle V needs to be set based on the relative position of the head HE acquired by the head position acquisition unit 42. That is, the speed limit setting unit 50 causes the autonomous driving ECU 38 to set the speed limit, thereby lowering the upper limit speed during autonomous driving.

Figure 7:
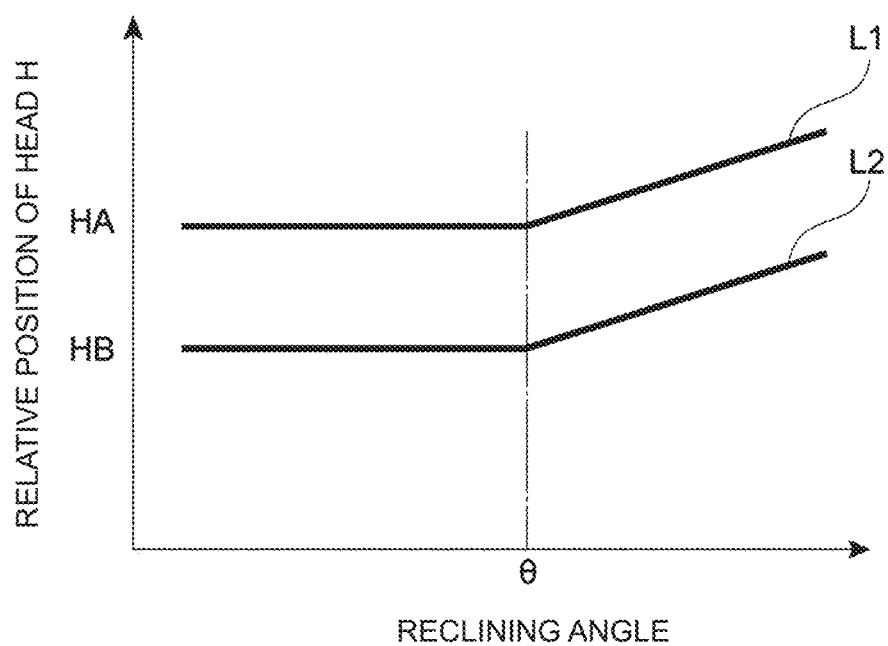
FIG. 7 shows determination threshold values for the relative height of the head with respect to the headrest and the reclining angle.

Specifically, the speed limit setting unit 50 sets the speed limit when the relative position H1 of the head HE is smaller than the threshold value L2 shown in FIG. 7. That is, in the case where the reclining angle is equal to or less than θ, when the relative position H1 of the head HE is smaller than HB, the speed limit is set. Further, in the case where the reclining angle exceeds θ, when the relative position of the head HE is smaller than the threshold value L2 that varies in accordance with the reclining angle, the speed limit is set.

When the reclining angle control unit 52 determines that it is necessary to change the reclining angle of the seat 12 based on the relative position of the head HE acquired by the head position acquisition unit 42, the reclining angle control unit 52 controls the seat 12 to cause the seat back 16 to pivot in the upright direction.

Specifically, when the relative position of the head HE is smaller than a predetermined threshold value, the reclining angle control unit 52 causes the seat back 16 to pivot in the upright direction. That is, in the case of the front seat 12A, when the relative position H1 of the head HE of the occupant P on the front seat 12A is smaller than a predetermined threshold value, the reclining angle control unit 52 causes the seat back 16 of the front seat 12A to pivot toward the rear of the vehicle.

Operations

Next, operations of the present embodiment will be described.

Example of Occupant Protection Auxiliary Process

Figure 8:
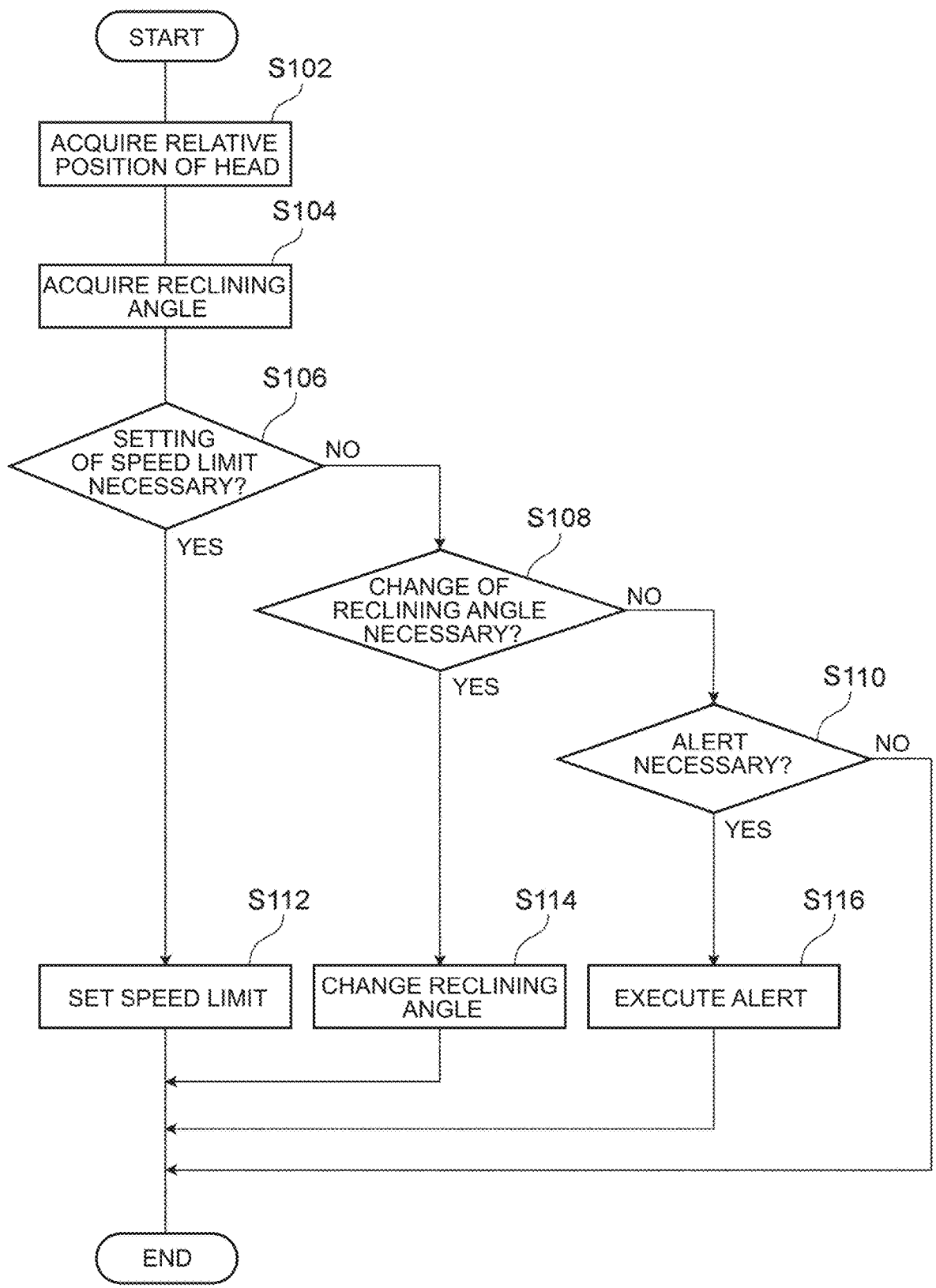
FIG. 8 is a flowchart showing an example of a flow of an occupant protection auxiliary process in the embodiment.

FIG. 8 is a flowchart showing an example of the flow of the occupant protection auxiliary process performed by the occupant protection auxiliary device 10. The occupant protection auxiliary process is executed as the CPU 20 reads a program from the ROM 22 or the storage 26 and deploys the program to the RAM 24.

The CPU 20 acquires the relative position of the head HE of the occupant P seated on the front seat 12A in step S102. Specifically, the CPU 20 acquires the relative position H1 of the head HE by the function of the head position acquisition unit 42.

The CPU 20 acquires the reclining angle of the front seat 12A in step S104. Specifically, the CPU 20 acquires the reclining angle of the front seat 12A by the function of the reclining angle acquisition unit 44.

The CPU 20 determines whether it is necessary to set the speed limit in step S106. Specifically, the CPU 20 changes the threshold value for determination depending on whether the reclining angle is larger than or smaller than θ.

In the case where the reclining angle is equal to or less than θ, the CPU 20 determines that setting the speed limit is necessary when the relative position H1 of the head HE is smaller than HB. Further, when the relative position H1 of the head HE is equal to or greater than HB, the CPU 20 determines that setting of the speed limit is unnecessary.

On the other hand, when the reclining angle is greater than θ, the CPU 20 calculates the threshold value L2 corresponding to the reclining angle based on the graph shown in FIG. 7, and when the relative position H1 of the head is smaller than the threshold value L2, it is determined that setting of the speed limit is necessary. When the relative position H1 of the head is equal to or greater than the predetermined threshold value L2, the CPU 20 determines that setting of the speed limit is unnecessary. Thus, when the reclining angle is equal to or less than θ, the threshold value L1 is a constant HB, and when the reclining angle is greater than θ, the threshold value L2 varies in accordance with the reclining angle.

When it is determined in step S106 that setting of the speed limit is necessary, the CPU 20 proceeds to the process of step S112 and sets the speed limit of the vehicle V by the function of the speed limit setting unit 50. Then, the occupant protection auxiliary process is terminated.

When it is determined in step S106 that setting of the speed limit is unnecessary, the CPU 20 proceeds to the process of step S108 and determines whether the reclining angle needs to be changed. In the present embodiment, as an example, when the relative position H1 of the head HE is smaller than HA and the reclining angle of the front seat 12A is larger than θ, the CPU 20 determines that the reclining angle of the front seat 12A needs to be changed.

When the CPU 20 determines in step S108 that the reclining angle needs to be changed, the process proceeds to step S114 and the CPU 20 changes the reclining angle of the front seat 12A. Specifically, the CPU 20 causes the seat back 16 of the front seat 12A to pivot toward the vehicle rear side, that is, in the upright direction, by the function of the reclining angle control unit 52. As an example in the present embodiment, the reclining angle control unit 52 causes the seat back 16 to pivot until the reclining angle becomes equal to or less than θ. Then, the occupant protection auxiliary process is terminated.

When it is determined in step S108 that the reclining angle does not need to be changed, the CPU 20 proceeds to the process of step S110 and determines whether the occupant P needs to be alerted. Specifically, the CPU 20 changes the threshold value for determination depending on whether the reclining angle is larger than or smaller than θ.

In the case where the reclining angle is equal to or less than θ, when the relative position H1 of the head HE is smaller than HA, the CPU 20 determines that the alert is necessary. Further, when the relative position H1 of the head HE is equal to or greater than HA, the CPU 20 determines that the alert is unnecessary.

On the other hand, when the reclining angle is greater than θ, the CPU 20 calculates the threshold value L1 corresponding to the reclining angle based on the graph shown in FIG. 7, and when the relative position H1 of the head is smaller than the threshold value L1, the CPU 20 determines that the alert is necessary. Further, when the relative position H1 of the head is equal to or greater than the predetermined threshold value L1, the CPU 20 determines that the alert is unnecessary. Thus, when the reclining angle is equal to or less than θ, the threshold value L1 is constant, and when the reclining angle is greater than θ, the threshold value L1 varies in accordance with the reclining angle.

When it is determined in step S110 that the alert is necessary, the CPU 20 proceeds to the process of step S116 and alerts the occupant P using the speaker 34 and a monitor (not shown) by the function of the alert unit 48. Then, the occupant protection auxiliary process is terminated.

When it is determined in step S110 that the alert is unnecessary, the CPU 20 ends the occupant protection auxiliary process without performing the alert.

As described above, in the occupant protection auxiliary device 10 of the present embodiment, the occupant P can sit on the front seat 12A mounted on the vehicle V while facing the vehicle rear side. The relative position H1 of the head HE of the occupant P with respect to the headrest 17 of the front seat 12A can be detected by the front seat infrared camera 18A.

Based on the detection result of the front seat infrared camera 18A, the control unit 19 determines whether to execute at least one of alerting the occupant P, setting the speed limit, and changing the reclining angle. Thus, for example, when the relative position of the head HE of the occupant P with respect to the headrest 17 is smaller than the threshold value L1, the occupant P is alerted.

Further, when the relative position H1 of the head HE of the occupant P is smaller than the threshold value L2, the speed limit of the vehicle V is set, thereby suppressing a collision at a high vehicle speed. Further, the control unit 19 causes the seat back 16 to pivot in the upright direction, making it difficult for the head HE of the occupant P to climb over the headrest 17 in the event of a frontal collision.

In the present embodiment, when the reclining angle is large with the occupant P being in a comfortable posture and when the relative position H1 of the head HE of the occupant P is relatively large, countermeasures against a frontal collision are executed. This can suppress unnecessary execution of countermeasures against a frontal collision compared to a configuration in which it is determined whether countermeasures against a frontal collision need to be executed based only on the relative position H1 of the head HE of the occupant P with respect to the headrest 17, and thus the comfort of the occupant P can be ensured.

In the present embodiment, the alert unit 48 alerts the occupant P by outputting a voice from the speaker 34. Thus, the occupant P can be prompted to change the seat position or the like.

In the present embodiment, the speed limit setting unit 50 sets the upper limit value of the vehicle speed under a predetermined condition, so that the vehicle V is suppressed from traveling in a speed range in which the collision load input to the vehicle V in the event of a frontal collision increases.

In the present embodiment, the reclining angle control unit 52 causes the seat back 16 to pivot in the upright direction under a predetermined condition, which can suppress the occupant P from riding up along the seat back 16 when the occupant P moves inertially toward the vehicle front side in the event of a frontal collision.

Although the occupant protection auxiliary device 10 according to the embodiment has been described above, the present disclosure can be implemented in various modes without departing from the scope of the present disclosure. For example, in the above-described embodiment, the configuration is such that at least one of alerting, setting the speed limit, and changing the reclining angle is executed based on the relative position H1 of the head HE and the reclining angle. However, the present disclosure is not limited to this, and the threshold value at the time of determination may be changed in accordance with the vehicle speed and the presence or absence of an oncoming lane.

When changing the threshold value at the time of determination in accordance with the vehicle speed, for example, when the speed of the vehicle V is 20 km/h or less, the alert is performed only when the relative position H1 of the head HE is smaller than the predetermined threshold value, regardless of the reclining angle. The threshold value at this time is set to a value larger than HA.

When the speed of the vehicle V is higher than 20 km/h, the determination on whether to perform the alert and set the speed limit is made based on a value obtained by multiplying the relative position H1 of the head HE by a coefficient corresponding to the vehicle speed. That is, since the coefficient is set to increase as the speed of the vehicle V increases, the threshold value L1 and the threshold value L2 shown in FIG. 7 increase. Therefore, even if the relative position H1 of the head HE is greater than HA, the alert and the setting of the speed limit can be executed when the speed of the vehicle V increases. The speed of the vehicle V can be detected by a vehicle speed sensor (not shown) or the like.

When there is an oncoming lane, the threshold value L1 and the threshold value L2 may be set larger than when there is no oncoming lane. The presence or absence of the oncoming lane is acquired by the function of the oncoming lane information acquisition unit 46.

When an oncoming vehicle traveling in the oncoming lane is detected by the peripheral sensor 36 or the like, the threshold value L1 and the threshold value L2 shown in FIG. 7 may be varied based on the relative speed obtained by adding the speed of the vehicle V and the speed of the oncoming vehicle.

By changing the threshold value based on the vehicle speed as described above, it is possible to suppress the unnecessary execution of countermeasures against a frontal collision when the vehicle speed is low, and the comfort of the occupant P can be ensured.

By changing the threshold value used for determining whether countermeasures against a frontal collision are necessary in accordance with the presence or absence of an oncoming lane, it is possible to improve the protection performance for the occupant P.

In the present embodiment, the seat back 16 and the headrest 17 are woven with a material having a high infrared reflectance, but the present disclosure is not limited to this. For example, a configuration of a modification shown in FIG. 9 may be adopted.

Modification

Figure 9:
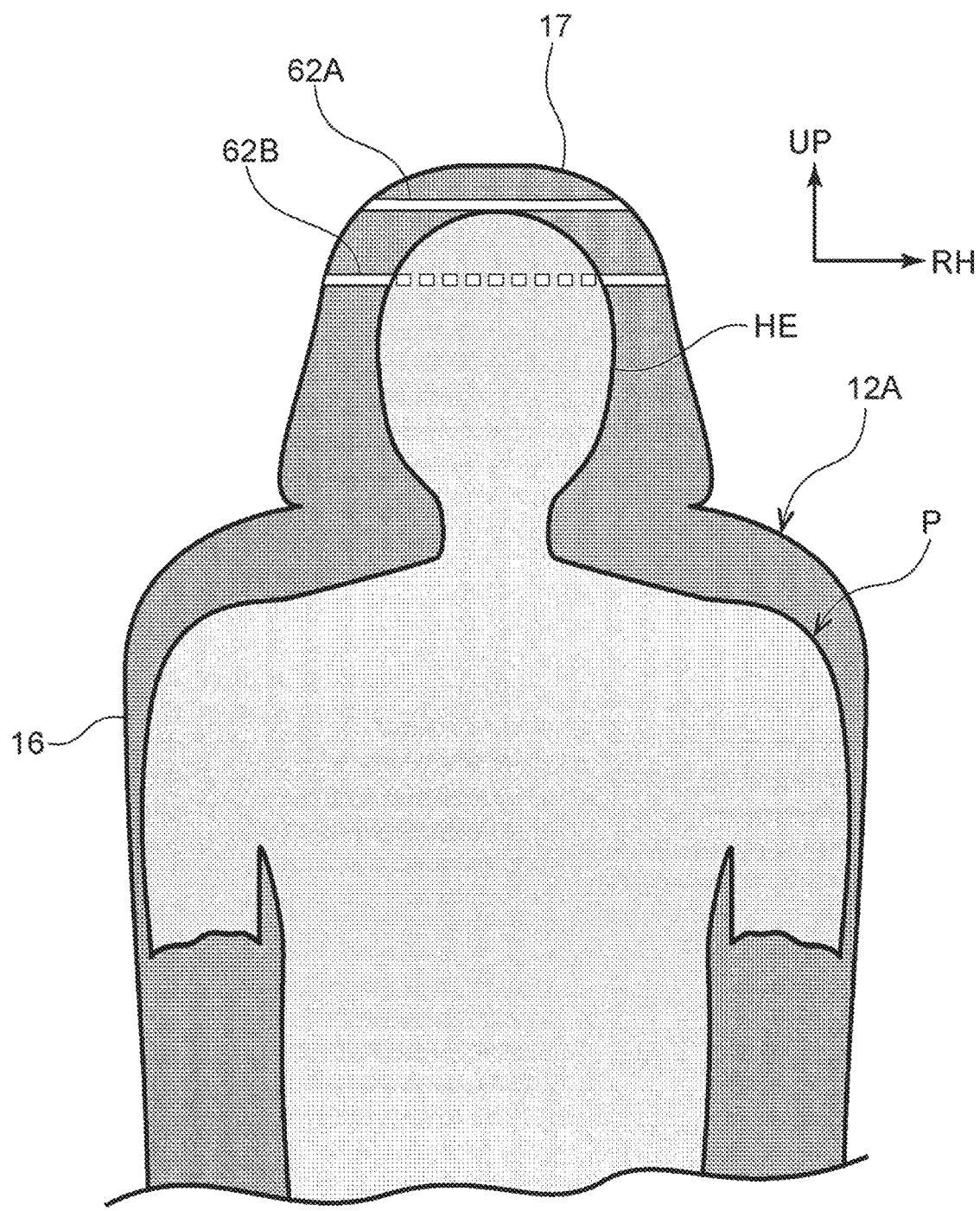
FIG. 9 is a diagram showing image data obtained by imaging the seat in a modification with an infrared camera.

As shown in FIG. 9, in the present modification, the seat back 16 is not woven with a material having a high infrared reflectance. A pattern 62A and a pattern 62B are woven into the headrest 17 with a material having a high infrared reflectance.

The pattern 62A extends linearly in the vehicle width direction on the upper end portion of the headrest 17. The pattern 62B is provided below the pattern 62A, and extends linearly in the vehicle width direction like the pattern 62A. The pattern 62A and the pattern 62B are configured to reflect infrared light when an image is captured by an infrared camera.

In the present modification, the occupant protection auxiliary device 10 acquires the relative position H1 of the head of the occupant P by the head position acquisition unit 42. When the head HE of the occupant P is positioned lower than the pattern 62B, the occupant P is not alerted. When the head HE of the occupant P is positioned higher than the pattern 62B and lower than the pattern 62A, the alert unit 48 alerts the occupant P. When the head HE of the occupant P is positioned higher than the pattern 62A, the speed limit is set.

Thus, in the present modification, the relative position H1 of the head HE of the occupant P can be easily grasped.

In the above-described embodiment and the modification, the configuration is such that the occupant P seated on the front seat 12A is alerted. In addition to this, an alert or the like may be performed to the occupant P seated on the rear seat 12B based on the relative position of the head of the occupant P seated on the rear seat 12B.

Further, in the above-described embodiment and the modification, the head position acquisition unit 42 acquires the relative position of the head HE of the occupant P on the front seat 12A based on the image information captured by the front seat infrared camera 18A. However, the present disclosure is not limited to this. For example, a sensor capable of detecting the height of the head HE of the occupant P seated on the front seat 12A may be installed, and the relative position of the head HE may be acquired based on the information detected by this sensor.

Various processors other than the CPU 20 may execute the process executed by the CPU 20 by reading the program in the above-described embodiment. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. The process may be executed by one of these various processors, or may be executed by a combination of two or more processors of the same kind or different kinds. For example, the process may be executed by a plurality of FPGAs, a combination of the CPU and the FPGA, and the like. Further, the hardware configuration of the various processors is, more specifically, an electric circuit in which circuit elements such as semiconductor devices are combined.

In the above-described embodiment, the storage 26 is configured to store various data. However, the present disclosure is not limited to this. For example, a non-transitory recording medium such as a compact disc (CD), a digital versatile disc (DVD), and a serial bus (USB) memory may be set as a storage unit. In this case, various programs, data, and the like are stored in the recording medium mentioned above.

Furthermore, the flow of processes described in the above embodiment is an example, and unnecessary steps may be deleted, new steps may be added, or the processing order may be changed within a range that does not deviate from the gist.

What is claimed is:

1. An occupant protection auxiliary device, comprising:
a seat mounted on a vehicle and on which an occupant is able to sit while facing a rear side of the vehicle;
a head detection sensor configured to detect a relative position of a head of the occupant with respect to a headrest of the seat; and
a control unit configured to
determine, based on a detection result of the head detection sensor, to execute alerting the occupant, setting a speed limit of the vehicle, and changing a reclining angle of the seat,
in response to determining to execute the alerting of the occupant based on the reclining angle and the relative position of the head, cause an alert unit to alert the occupant, wherein the relative position of the head to execute the alerting is based on a height difference between an upper end of the headrest and the head,
in response to determining to execute the setting of the speed limit based on the relative position of the head, cause a speed limit setting unit to set the speed limit, wherein the relative position of the head to execute the setting of the speed limit is based on a height difference between the upper end of the headrest and an eye level of the occupant, and
in response to determining to execute the changing of the reclining angle based on the relative position of the head, cause a reclining angle control unit to control the reclining angle, wherein the relative position of the head to execute the changing of the reclining angle is based on the height difference between the upper end of the headrest and the eye level of the occupant.

2. The occupant protection auxiliary device according to claim 1, wherein
the control unit configured to, based on a speed of the vehicle and the detection result of the head detection sensor, determine to execute alerting the occupant, setting the speed limit, and changing the reclining angle.

3. The occupant protection auxiliary device according to claim 2, wherein
the control unit is configured to change a threshold value at a time of determination in accordance with presence or absence of an oncoming lane.

4. The occupant protection auxiliary device according to claim 1, wherein
the control unit is configured to, in response to determining to execute the alerting of the occupant, alert the occupant by a voice from a speaker mounted on the vehicle.

5. The occupant protection auxiliary device according to claim 1, wherein
the control unit is configured to, in response to determining to execute the setting of the speed limit, set an upper limit value of a vehicle speed.

6. The occupant protection auxiliary device according to claim 1, wherein
the control unit is configured to, in response to determining to execute the changing of the reclining angle, control the seat such that a seat back pivots in an upright direction.

7. The occupant protection auxiliary device according to claim 1, wherein
the head detection sensor includes a camera configured to capture an image of the occupant from the rear side of the vehicle.

8. The occupant protection auxiliary device according to claim 7, wherein
a pattern is woven into the headrest with a material having a high infrared reflectance, and the camera is an infrared camera.

9. An occupant protection auxiliary device, comprising:
a seat mounted on a vehicle and on which an occupant is able to sit while facing a rear side of the vehicle;
a head detection sensor configured to detect a relative position of a head of the occupant with respect to a headrest of the seat; and
a control unit configured to,
in response to a reclining angle of the seat being equal to or less than a predetermined angle,
determine to execute a setting of a speed limit when the relative position of the head is smaller than a first predetermined constant value, and
determine to not execute the setting of the speed limit when the relative position of the head is equal to or greater than the first predetermined constant value,
in response to the reclining angle being greater than the predetermined angle,
calculate a first threshold value varying in accordance with the reclining angle,
determine to execute the setting of the speed limit when the relative position of the head is smaller than the first threshold value, and
determine to not execute the setting of the speed limit when the relative position of the head is equal to or greater than the first threshold value,
in response to determining to execute the setting of the speed limit, cause a speed limit setting unit to set the speed limit, and
in response to determining to not execute the setting of the speed limit, determine whether to execute a changing of the reclining angle.

10. The occupant protection auxiliary device according to claim 9, wherein
the control unit is configured to,
in response to the reclining angle being greater than the predetermined angle, determine to execute the changing of the reclining angle when the relative position of the head is smaller than a second predetermined constant value,
in response to determining to execute the changing of the reclining angle, cause a reclining angle control unit to control the reclining angle, and
in response to determining to not execute the changing of the reclining angle, determine whether to execute an alerting of the occupant.

11. The occupant protection auxiliary device according to claim 10, wherein
the control unit is configured to,
in response to the reclining angle being equal to or less than the predetermined angle,
determine to execute the alerting when the relative position of the head is smaller than the second predetermined constant value, and
determine to not execute the alerting when the relative position of the head is equal to or greater than the second predetermined constant value,
in response to the reclining angle being greater than the predetermined angle,
calculate a second threshold value varying in accordance with the reclining angle,
determine to execute the alerting when the relative position of the head is smaller than the second threshold value, and
determine to not execute the alerting when the relative position of the head is equal to or greater than the second threshold value, and
in response to determining to execute the alerting of the occupant, cause an alert unit to alert the occupant.

* * * * *